J. W. HAINES.
Silvered Glass Door-Knobs.
No. 141,504. Patented August 5, 1873.
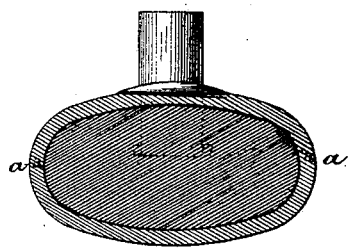
Witnesses.
Inventor.

UNITED STATES PATENT OFFICE.

JOHN W. HAINES, OF CAMBRIDGEPORT, MASSACHUSETTS.

IMPROVEMENT IN SILVERED-GLASS DOOR-KNOBS.

Specification forming part of Letters Patent No. 141,504, dated August 5, 1873; application filed March 18, 1873.

*To all whom it may concern:*

Be it known that I, JNO. W. HAINES, of Cambridgeport, county of Middlesex and State of Massachusetts, have invented certain new and useful Improvements in Glass Knobs, of which the following is a specification:

The nature of my invention relates to an improvement in glass door-knobs; and it consists in filling the glass shell with cement, for the purposes of securing the knob to the shank, protecting the silver lining, and to show the defects in the silvering, as well as to make a more solid and substantial knob, which will not be so easily fractured and broken.

The accompanying drawing represents a section view of my knob.

*a* represents the glass shell, which is made in the usual manner, and silvered on its inside with a solution of nitrate of silver dissolved in ammonia, distilled water, and tartaric acid or sugar. The knob is filled with this solution, after having been filtered, and then heat is applied to the knob, which causes the silver held in the solution to be deposited upon the glass. This silver may be deposited either evenly or very unevenly over the surface of the glass, according to circumstances.

This composition is very sensitive, and has to be properly prepared, or else its imperfections will very soon make themselves manifest, and ruin the beautiful appearance of the knob.

Heretofore there has been no means of testing the composition, either as to its qualities, or as to whether it has adhered evenly over the whole surface of the inside of the shell or not, and the knobs have been secured to the shanks, as far as these two points are concerned, merely upon guess work. If the composition were right, and it were allowed to fully dry before closing up the opening, and there were no moisture in the atmosphere, then all were well. But if the composition were not right—if it had not evenly adhered to the shell; if it were not fully dry before the shell was sealed up; or if the atmosphere were filled with moisture from rain, fog, or other causes—then the silver were sure to oxidize, and in a very short time entirely ruin the appearance of the knob.

Attempts have been made to prevent this oxidation by hermetically sealing the knob and shank together by some composition, but owing to the expansion and contraction of the parts from heat and cold, or by pulling or striking against them, this joint will sooner or later become loose, and then, moist air getting in, the oxidation at once begins.

In order to prevent this oxidation, show the defects in the adhesion of the silver over the surface, secure the shank to the knob, and to make the knob more solid and less liable to break, I pour the shell full of liquid cement, which not only expels every particle of air, but which, in hardening, binds the shank firmly to the shell. Thus filled, the knob becomes practically a solid glass knob, the cement serving to back up the silver so as to prevent it from all injury whatever, and as a background against which every defect, either in the composition itself, or in the adhesion of the silver to the surface of the knob, is plainly shown, and thus I am enabled to detect all imperfect work in time to prevent it from being thrown upon the market.

This process of silvering the inside of the knob is different in every respect from that of silvering looking-glasses. The silvering substance for glasses consists of an amalgam of mercury and tin, and can only be applied to perfectly-flat surfaces; whereas the composition above described is poured into the article to be silvered in a liquid state, and then the silver is precipitated by the application of heat settling over the most uneven and broken surface.

Having thus described my invention, I claim—

The within-described process of silvering and backing up the silver lining of glass door-knobs, by filling the shell with cement, so as to exclude the air and protect the silver from oxidation, substantially as shown and described.

In testimony that I claim the foregoing as my invention I hereunto affix my signature this 12th day of March, 1873.

JOHN W. HAINES.

Witnesses:
NATHANIEL DENNETT,
WILLIAM H. PIERCE.